Patented Dec. 20, 1938

2,140,657

UNITED STATES PATENT OFFICE 2,140,657

COATING COMPOSITION AND PROCESS OF PREPARING SAME

Mortimer I. Strauss, Cleveland Heights, Ohio

No Drawing. Application January 25, 1937, Serial No. 122,221

3 Claims. (Cl. 134—26)

My invention relates to a process of preparing a coating composition, such as a varnish or cement, by means of which its physical properties may be materially improved.

Patent No. 1,386,380, issued to me on August 2, 1921, discloses a process of preparing a varnish or cement which is suitable for use in sealing joints or seams in containers such as tanks or conduits, or for coating gaskets, packing or other resilient material which is affected by gasoline, kerosene, oils and the like. The composition described in the above-mentioned patent is adhesive to material such as metal, wood, rubber or concrete and is characterized by being flexible when dry so that it may be bent without cracking. When prepared as a cement, the material may also be utilized alone as a gasket or as a packing material.

While the composition described in my previous patent is satisfactory in preparing a tight joint for containers or conduits in which gasoline, kerosene or oil is being stored or conducted at ordinary temperatures and pressure and in which the chief requirement is to prevent fire hazards or the loss of the liquid through leakage, it has not proved adequate in preventing leakage when the joint is subjected to severe changes in pressure and temperature conditions. For instance, in vessels or conduits in which gases are stored or utilized under high pressure, such as those employed in refrigeration or air conditioning apparatus, it is often necessary to provide leak-proof joints when the gas is subjected to temperatures ranging from below zero to 200° F. and for pressures ranging up to 200 pounds or higher per square inch. For containers utilized in the aviation industry, it is also desirable to provide a joint which is resilient, elastic and flexible enough to provide tight seals when the container is subjected to prolonged vibration.

It is therefore an object of my invention to provide an improved process of producing a varnish or cement which is elastic, flexible and resilient and which may be utilized to provide leak-proof joints in vessels or conduits subjected to high temperatures and pressure conditions or to prolonged vibration.

Another object of my invention is to provide an improved process of preparing a varnish or cement which may be utilized in the form of a varnish or as a gasket to provide leak-proof joints in tanks, vessels, containers or conduits in which a liquid or a gas is being subjected to high temperatures and pressures.

A further object of my invention is to provide an improved process of preparing a varnish or cement which retains its resiliency, elasticity and flexibility even when subjected to vibration or to widely varying changes in pressure and heat conditions.

In preparing my improved composition, shellac or a shellac-like substance is first dissolved in a suitable alkaline solution, such as caustic soda, preferably in the presence of heat to promote solution. While any suitable shellac may be employed I preferably utilize a high grade shellac, such as orange shellac. The mixture is carefully stirred until all the shellac is dissolved during which process the sodium combines with the resin content of the shellac to form sodium resinates. The waxy substance which forms on the surface of the solution is skimmed off or otherwise removed. This waxy substance probably consists of impurities in the shellac, although it may contain a slight quantity of the shellac itself.

The solution is then treated with a suitable acid, for example, dilute sulphuric acid, in an amount sufficient to neutralize any trace of the caustic soda remaining in the solution and to reprecipitate the shellac in its resinous form. The acid is added slowly to the resinate solution and the product is allowed to stand until complete precipitation occurs. The salt solution is then drained off and the precipitate is washed several times with water. The precipitate is then heated to drive off any remaining traces of water, the temperature, however, not being carried sufficiently high to produce any change in the composition of the solid matter. The solid matter is now slowly cooled and is thinned to about the consistency of a thick syrup with a suitable solvent such as alcohol. A body material is then preferably added to improve the consistency and spreading properties of the varnish. A suitable substance for this purpose is Venetian red or some other suitable coloring material which provides body, improves the spreading properties and gives the material a distinct color. The process of producing the varnish thus far described is substantially the same as that disclosed in my previous patent and the specific proportions mentioned in that patent may be employed in preparing the varnish.

In accordance with my improved process the composition, thus prepared, is allowed to stand or age for a considerable length of time, say from approximately a week to a month, and it is then stirred or agitated vigorously in a suitable container or vessel by any convenient means, such as paddles or a centrifugal device. The stirring causes certain ingredients or impurities suspended in the composition to be driven to the sides of the vessel or to form coherent particles which may be readily removed by passing the composition through a fine mesh sieve or a screen, such as one having approximately 200 meshes per square inch or even finer. Any convenient means may be employed for accomplishing this action, such as an ordinary centrifugal extractor having the usual perforated or foraminous cylindrical basket equipped with removable or replaceable wire screen and rotatable within a stationary curb having a collecting drain channel for the strained material. If desired, the strained varnish thus produced may be aged for one or more additional periods and after each period of standing may again be agitated and strained in a similar manner.

The character of the suspended material which is removed by my improved process is not known. It is believed, however, that impurities in the shellac or possibly a certain portion of the shellac itself may be removed. The removal of the coherent suspended particles or impurities, however, effects a remarkable change in the physical properties of the varnish. The elasticity and smoothness are greatly improved. For instance, my improved varnish is capable of resisting a temperature of 200° F. or higher without losing its elasticity. A one-inch pipe joint sealed with the varnish has successfully resisted the leakage of gas at pressures ranging from 35 to 200 pounds per square inch. When utilized as a seal for seams on gasoline aircraft tanks subjected to the Hunt vibration test for 180 hour intervals over a period of six months, the elasticity of the varnish was sufficient to prevent the formation of cracks.

My improved varnish may also be modified for use as a cement, in which case a solid inert filling material is added which has high heat resistance and which is impervious to and unaffected by gasoline, oils, chlorinated or other refrigerants and the like. Powdered silica or silicates having a high heat resistance may be employed for this purpose although I prefer to utilize a fibrous material, such as finely divided asbestos. The quantity of this inert body material may of course be varied but approximately 2½ pounds to each gallon of the varnish forms a satisfactory cement. This cement not only may be utilized as a coating for other packing material but may also be employed by itself and this is particularly true where conditions exist which require a thicker material than the varnish. For instance, it may replace fibrous or other gaskets and sheet packing. The improved elasticity imparted to the varnish by my process also greatly improves the elasticity and smoothness of the cement. For instance, when the plastic cement is employed in place of gaskets, it is often required that the maximum irregularity shall not exceed 1/64 of an inch. This is particularly true when the cement is utilized to replace gaskets in refrigerating machines where the hydraulic pressure may run up to 500 pounds per square inch. In containers of this type it is essential that the seams shall be absolutely tight otherwise poisonous gases, such as ammonia, sulphur dioxide or methyl chloride may escape, and unless suspended particles which affect the smoothness of the cement are removed, it is impractical to provide absolutely gas-tight joints.

From the foregoing description, it will be apparent that by my improved process a varnish or cement is provided which is not only impervious to gasoline, kerosene, oils, refrigerants or other liquids or gases, but which has greatly improved flexibility, smoothness and elasticity and which is capable of resisting considerably higher temperature and pressure conditions than varnishes or cements which have been previously employed.

By improving the elasticity of my improved cement or varnish it is also apparent that the product is capable of resisting high pressure or continued vibrations and since it is impervious to gasoline, kerosene, oil and refrigerants, it may be advantageously utilized as a coating for gaskets or as a gasket itself in tanks or conduits in which high temperature or pressure conditions exist or in which repeated vibrations are encountered.

By removing certain suspended particles from the varnish I am also able to obtain a product which has greater smoothness and which clings more tenaciously to metal, wood or concrete surfaces than the product produced by my former process and even when subjected to intense heat its flexibility is unaffected.

What I claim is:

1. The method of preparing a comparatively smooth varnish which is flexible when dry and capable of resisting a comparatively high temperature without losing its elasticity, which comprises ageing a mixture of shellac, from which alkali insoluble material has been removed, a bodying material which improves the spreading properties of the shellac, and sufficient alcohol to form a mass of syrup-like consistency, for an extended period of time, agitating the material to produce coherent suspended particles of impurities, and then passing it through a comparatively fine mesh screen to remove the coherent particles above a predetermined size.

2. The method of preparing a comparatively smooth varnish which is flexible when dry and is capable of maintaining its elasticity when subjected to intense vibration or to temperatures in excess of 200° F., which comprises ageing a mixture of a substantially pure shellac from which alkali insoluble material has been removed, a bodying material which improves the spreading properties of the shellac, and sufficient alcohol to form a mass of syrup-like consistency, for a week to a month, agitating the aged material to produce coherent suspended particles of impurities, and then passing it through a comparatively fine mesh screen to remove the coherent particles above a predetermined size.

3. An improved composition of matter which is flexible when dry and which retains its elasticity when subjected to a temperature of 200° F. or higher, comprising a mixture prepared by the process set forth in claim 1.

MORTIMER I. STRAUSS.